United States Patent
Gerlinger et al.

(10) Patent No.: US 8,597,586 B2
(45) Date of Patent: Dec. 3, 2013

(54) SHELL-AND-TUBE REACTOR HAVING A DISTRIBUTION DEVICE FOR A GAS-LIQUID PHASE MIXTURE

(75) Inventors: Wolfgang Gerlinger, Limburgerhof (DE); Torsten Mattke, Freinsheim (DE); Oliver Bey, Niederkirchen (DE)

(73) Assignee: BASF SE (DE)

( * ) Notice: Subject to any disclaimer, the term of this patent is extended or adjusted under 35 U.S.C. 154(b) by 668 days.

(21) Appl. No.: 12/090,198

(22) PCT Filed: Oct. 9, 2006

(86) PCT No.: PCT/EP2006/067196
§ 371 (c)(1),
(2), (4) Date: Jul. 16, 2008

(87) PCT Pub. No.: WO2007/045574
PCT Pub. Date: Apr. 26, 2007

(65) Prior Publication Data
US 2009/0220391 A1 Sep. 3, 2009

(30) Foreign Application Priority Data
Oct. 20, 2005 (DE) .......................... 10 2005 050 284

(51) Int. Cl.
*F28D 7/00* (2006.01)
(52) U.S. Cl.
USPC ............................ 422/201; 422/211; 422/220
(58) Field of Classification Search
USPC .......... 422/187, 195, 197, 201, 205, 207, 211, 422/220, 231
See application file for complete search history.

(56) References Cited

U.S. PATENT DOCUMENTS

| | | | |
|---|---|---|---|
| 4,233,269 A | 11/1980 | Kaye et al. | |
| 4,985,209 A | 1/1991 | Renard et al. | |
| 5,043,145 A | 8/1991 | Lietz et al. | |
| 6,013,834 A | 1/2000 | Colling | |
| 6,029,956 A * | 2/2000 | McGrath | 261/114.1 |
| 6,123,323 A | 9/2000 | Yoneda et al. | |
| 6,175,040 B1 | 1/2001 | Zardi et al. | |
| 2004/0028578 A1* | 2/2004 | Zardi | 422/188 |

FOREIGN PATENT DOCUMENTS

| | | |
|---|---|---|
| CN | 1342136 A | 3/2002 |
| GB | 2148141 | 5/1985 |
| JP | S50-3960 A | 1/1975 |
| JP | S53-63131 A | 6/1978 |
| JP | H01-194936 A | 8/1989 |

(Continued)

*Primary Examiner* — Walter D Griffin
*Assistant Examiner* — Timothy Cleveland
(74) *Attorney, Agent, or Firm* — Novak Druce Connolly Bove + Quigg LLP

(57) ABSTRACT

A shell-and-tube reactor is disclosed. Contact tubes are disposed within a cylindrical housing and are secured to tube plates. Gas and liquid phases are received via a feed opening in a lower end cap and discharged via an upper end cap in the housing. A distributor device for a gas phase/liquid phase mixture is disposed below the lowermost tube plate. The distributor device includes a distributor plate and a predistributor. The distributor plate is arranged horizontally within the housing and includes an active area having through-openings and a downward-extending margin, but does not extend over the entire cross section of the housing. The predistributor includes a second distributor plate disposed between the feed opening and the first distributor plate, wherein the second distributor plate includes a second active area with second through-openings and a second downward-extending margin.

10 Claims, 3 Drawing Sheets

(56) References Cited

FOREIGN PATENT DOCUMENTS

| | | |
|---|---|---|
| JP | H04-166223 A | 6/1992 |
| JP | H10-118473 A | 5/1998 |
| WO | WO-99/39815 A1 | 8/1999 |
| WO | WO-99/46037 A1 | 9/1999 |
| WO | WO-99/50235 A1 | 10/1999 |

* cited by examiner

SHELL-AND-TUBE REACTOR HAVING A DISTRIBUTION DEVICE FOR A GAS-LIQUID PHASE MIXTURE

Priority is claimed as a national stage application under 35 U.S.C. §371 to PCT/EP2006/067196, filed Oct. 9, 2006, which claims priority to German application 10 2005 050 284.9, filed Oct. 20, 2005. The aforementioned priority documents are incorporated herein by reference as if set forth in full.

DESCRIPTION

The invention relates to a distributor device for a gas phase/liquid phase mixture for apparatuses for uniformly distributing a gas phase and a liquid phase over the cross section of the apparatus.

In chemical processes it is frequently necessary to introduce a gas phase and a liquid phase, in particular in the form of a gas phase/liquid phase mixture, into an apparatus via at least one feed opening whose hydraulic diameter can be smaller than the hydraulic diameter of the apparatus. The hydraulic diameter ratios and the associated flow conditions and also the prevailing density difference between gas phase and liquid phase result, in particular, in a nonuniform distribution of the gas phase over the cross section of the apparatus. This leads to problems, especially when a continuous fixed bed is located in the apparatus or when contact tubes filled with solid particles, for example catalysts, or gaps between heat-exchange plates are present. However, some flow conditions can also lead to a degree of separation of liquid and gas phase even in the feed line or to nonuniform inflow of gas and liquid phase, which make it necessary to make the inflow stream more uniform.

Furthermore, the introduction of a two-phase mixture and uniform distribution of this over the cross section of the apparatus have been found to be problematical since a change in the gas-liquid distribution or in the component composition in the two phases results in an additional degree of freedom in the two-phase mixture. Thus, a nonuniform distribution of the phases can lead to a shift in the equilibrium and thus to a local change in the component composition of the individual phases. For example, vaporization of a component from the liquid phase can occur in the marginal regions which are reached only unsatisfactorily by the gas phase, so that the liquid phase becomes depleted in this component.

Apparatuses for chemical reactions into which a gas phase and a liquid phase are introduced have, inter alia, a central, cylindrical or prismatic part in which the chemical reaction takes place. If appropriate, the chemical reaction is catalyzed, with a continuous fixed bed, contact tubes filled with catalysts or catalyst particles or heat-exchange plates with gaps between them being provided in the apparatus. The apparatus is closed at the two ends by lids or end plates which are, for example, flat or curved, in the form of dished ends, vault-shaped ends or parts of a sphere.

In the region of a lower end plate, a gas phase/liquid phase mixture can be introduced into the apparatus via a feed opening of a feed device. When the gas phase/liquid phase mixture enters the interior of the apparatus through the feed opening, formation of large gas bubbles or a gas jet can occur as a result of a coalescence of the gas phase and these can rise centrally and possibly impinge on the surface of a fixed bed or a tube plate in which the contact tubes are arranged. In contrast thereto, the gas phase reaches the outer regions of the apparatus only unsatisfactorily, causing a locally changed distribution. Under some circumstances, a phase transition of one or more components additionally takes place so that a locally changed equilibrium occurs. This causes nonuniformity in the reaction conditions in the apparatus, as a result of which the chemical reaction does not proceed optimally. However, a nonuniform distribution of the two phases can occur even in the feed line. Furthermore, gas bubbles of different sizes lead to an undesirable nonuniform distribution of the two phases over the cross section of the apparatus.

To make the distribution of the gas phase/liquid phase mixture more uniform and to avoid the problems described, it is necessary to use distributor devices in the region of the feed opening. By analogy to gas distributors which are used for making the gas distribution uniform in an apparatus in which a continuous liquid phase is present, for example a bubble column, porous sintered plates, perforated plates and screen plates are known. If a gas phase is introduced into the apparatus, the internals, for example in the form of perforated plates or sintered plates, produce a backing-up of the gas phase below the plate because of the pressure drop, as a result of which the gas phase reacts with a flow through the plate which is uniform over the cross section to minimize the flow resistance. In this way, gas is dispersed in the liquid to achieve large phase interface areas for heat and mass transfer. These static internals which produce a pressure drop cover a wide cross section of the apparatus, as a result of which a high pressure drop occurs and this increases the operating costs. When used in apparatuses in which a fixed bed is present, such internals make access to the fixed bed located behind them difficult, particularly when it may be necessary to replace the exhausted catalyst in a fixed bed of catalyst. However, such internals have been found to be unsuitable for making flow more uniform in apparatuses in which both phases are subjected to flow.

To the contrary, these internals produce a locally changed gas-liquid distribution in a multiphase multicomponent system. This non-steady-state effect can cause a movement in the flow of, in particular, the liquid phase which due to a nonhorizontal orientation of the internals producing the pressure drop leads to further separation of the two phases.

Guide plates onto which a gas jet impinges so that it disintegrates into individual bubbles or jets are likewise known as distributor device for a gas phase. However, this is known to give only a reduction in the abovementioned problems with uniform distribution of a gas phase/liquid phase mixture, but not a solution to these problems.

Ring distributors which are accommodated in a tube plate and have a multiplicity of feed openings for making a distribution more uniform require a large installation volume since a plurality of rings having a large number of openings are necessary for a uniform distribution. A problem is found to be that uniform flow of the two-phase mixture has to be ensured within the ring distributors in order to avoid a shift in the gas-liquid distribution.

In view of this, it was an object of the present invention to provide a distributor device for a gas phase and a liquid phase, in particular as a two-phase mixture, for an apparatus in order to achieve a uniform distribution over the entire cross section of the apparatus, which does not have the abovementioned disadvantages. In particular, a uniform distribution over the entire cross section of the apparatus should be ensured at a constant composition of the phases, and the distributor device should be structurally simple and correspondingly inexpensive. The distributor device should be suitable for essentially all types of gas-liquid contact apparatuses, preferably for apparatuses in which a fixed bed is present, or shell-and-tube apparatuses having a plurality of contact tubes which are welded into tube plates and filled with catalyst particles. It should also be suitable for apparatuses with heat-exchange plates arranged therein with gaps between the heat-exchange plates which are filled with a particulate heterogeneous catalyst.

This object is achieved by a distributor device for a gas phase/liquid phase mixture for an apparatus into whose interior a gas phase and a liquid phase are introduced via at least one feed opening, wherein a distributor plate arranged horizontally in the apparatus comprises an active area with through-openings and a downward-extending margin, with the distributor plate not extending over the entire cross section of the apparatus.

In a preferred embodiment, the distributor device is supplemented by a second distributor plate which is arranged between the feed opening and the first distributor plate and comprises an active area having a plurality of through-openings and a downward-extending margin and functions largely as predistributor.

Apparatuses in which the distributor devices of the invention are used are, in particular, ones in which a fixed bed is located, for example on a support grating or shell-and-tube apparatuses in which a plurality of contact tubes are welded into tube plates and the gas phase/liquid phase mixture is fed via at least one feed opening in an end cap, passed, for example, through the contact tubes and taken off from the apparatus via the other end cap.

The nonuniform distribution of a two-phase mixture occurring hitherto is caused, in particular, by the hydraulic diameter of the feed opening being many times smaller than the hydraulic diameter of the apparatus. The term "hydraulic diameter" refers in hydrodynamics to the ratio of four times the area to the circumference of an opening. Owing to the density difference between gas phase and liquid phase, the gas bubbles of the two-phase mixture rise more rapidly or coalescence behavior at the feed opening can lead to formation of large gas bubbles or a gas jet so that the gas phase rises largely centrally at a high velocity. However, a feed line which is, for example, curved can result even there in formation of large gas bubbles which lead to the problems described when introduced into the apparatus.

The function of the distributor devices of the invention is based on a separation of the gas phase and the liquid phase at the distributor device. A gas cushion is formed in the space bounded by a margin below the distributor plate so that the liquid phase does not flow through the through-openings of the active area. Rather, the liquid phase flows laterally past the downward-extending margin of the distributor device, through the free annular space between the distributor device and the interior wall of the apparatus and is distributed over the entire cross section of the apparatus above the distributor plate. The gas phase passes through the through-openings of the distributor plate and is dispersed uniformly in the liquid over the cross section of the distributor. As a result, a constant distribution of the two-phase multicomponent system over the cross section of the distributor is achieved.

The height of the gas cushion formed is a function of the prevailing pressure drop of the gas flow through the distributor plate, the pressure drop of the liquid phase and the hydrostatic pressure difference between gas and liquid. Depending on the density difference between gas and liquid phase, gas volume flow or type of loading and number and diameter of the through-openings of the distributor plate, a height of the gas cushion which can vary greatly is established.

The distributor plate is, if possible, arranged horizontally in the apparatus, as a result of which the gas cushion formed below the distributor plate has a constant height. To achieve very precise horizontal alignment of the distributor plate, brackets, for example, are welded onto the interior wall of the apparatus so that the distributor device can be attached by means of these. However, fastening to the internals which follow in the flow direction, for example a tube plate, or to the lid or end plate of the apparatus is also conceivable.

The arrangement of the distributor devices results in a flow of the liquid phase transverse to the ascent direction of the gas phase dispersed at the through-openings of the active area being able to be formed above the distributor plate. To largely minimize the influence of this transverse flow on the ascent direction of the dispersed gas bubbles, a very low flow velocity of the liquid phase is sought in one embodiment of the invention. This is achieved by a large area being made available for the flow of the liquid phase. The cross section of the distributor plate is selected so that, firstly, the gas phase dispersed at the distributor device is spread over essentially the entire cross section of the apparatus and, secondly, the flow velocity of the liquid phase is low. The shape of the distributor plate can for this purpose be, depending on the geometry of the apparatus, circular, polygonal or any other shape.

The distance between the distributor plate and possible internals of the apparatus, for example a tube plate, is selected so that transverse flow of the liquid phase above the distributor plate at a low flow velocity is possible and is accordingly dependent on the system and the prevailing volume flow. In particular, this spacing ensures that the distribution between liquid phase and gas phase becomes more uniform over the cross section of the apparatus.

The number and arrangement of the through-openings in the active area of the distributor plate depends on the configuration of the apparatus. If the apparatus comprises internals such as catalyst particles of a fixed bed located on a support grating or contact tubes filled with catalyst particles and welded into a tube plate, the distributor devices of the invention ensure that the two-phase mixture is spread uniformly over the cross section of the apparatus. The through-openings of the active area can, depending on the use, have different shapes, for example holes or slits, and can also be varied within the distributor device. In the case of an apparatus configured as a shell-and-tube reactor, the plane of the holes of the active area of the distributor plate is aligned so as to correspond substantially to the plane of the contact tubes welded into the tube plate, so that a through-opening of the active area of the distributor plate is located beneath the opening of the contact tube. In an advantageous embodiment of the apparatus configured as a shell-and-tube reactor, the internal diameter of the contact tubes is chosen in the range from 25 to 300 mm, preferably from 30 to 100 mm, in particular from 40 to 70 mm. The diameter of the through-openings of the active area of the distributor plate is from 0.5 to 20% of the internal diameter of a contact tube. A suitable diameter ratio is determined by the need for a sufficient gas cushion to be obtained at the prevailing volume flow ratio which is preferably in a range of gas volume flow to liquid volume flow of from 1:10 to 10:1.

The height of the downward extending margin of the distributor devices is selected so that a sufficient height of the gas cushion is formed regardless of the type of loading prevailing in the apparatus. This ensures that the gas phase is only dispersed through the through-openings of the distributor plate and is not entrained by the liquid phase flow. Possible heights of the margin are in the range from 0.01 to 0.6 m, preferably from 0.05 to 0.25 m.

If the distributor devices are located in an end cap which closes off the apparatus, it is advantageous to fit the downward-extending margin to the contour of the end cap by angling it slightly, as a result of which the construction height is reduced.

In some systems, sufficient separation of the gas phase and the liquid phase does not occur at the distributor device and thus the formation of a constant height of gas cushion over the cross section of the distributor which is necessary for the function of the distributor device of the invention does not occur either. A pronounced coalescence behavior or nonuniformities in the feed line also lead to instability of the height of the gas cushion, as a result of which the function of the distributor devices is greatly impaired. A distributor device having two distributor plates has been found to be advantageous here. A second distributor plate, which is preferably arranged centrally between the feed opening and the first distributor plate, functions as predistributor.

This predistributor serves to achieve a first evening-out of the ascending gas phase, with a uniform size of the ascending gas bubbles over the predistributor plate not being necessary. The gas phase flows both through the through-openings arranged on the active area of the second distributor plate and also in dispersed form in the liquid phase stream flowing past.

The second distributor plate of this distributor device according to the invention can have a diameter smaller than the diameter of the first distributor plate, and preferably has a size which is between the diameter of the distributor plate and the diameter of the feed opening. The function of a predistributor is primarily to carry out a first evening-out of the gas phase, inter alia by breaking up large ascending gas bubbles. The diameter of the through-openings of the active area of the second distributor plate is selected so that the total area of openings derived from the number of openings and the diameter of the openings is from 1.5 to 3 times that for the first distributor plate.

As an alternative, the margin of the second distributor plate functioning as predistributor can be inclined outward at a particular angle to the plate and likewise be provided with holes. Thus, the second distributor plate has the shape of the surface of a truncated cone, with a central flat region and a peripheral region being comprised. The through-openings in the central and peripheral regions for the passage of gas are not restricted. They can be configured as holes, slits or openings of other shapes. The through-openings in the central region and in the peripheral region can be different. The through-openings in the peripheral region are preferably larger than those in the central region in order to promote dispersion of the gas phase backed up under the predistributor in the liquid phase flowing past. Distributor and predistributor are advantageously joined to one another as a preassembled unit.

The predistributor can, however, also be configured as a ring which has a margin with a zig-zag edge. This crown-like predistributor causes the ascending gas bubbles to be broken up at the zig-zag edge and rise upward in predispersed form.

Comprehensive studies have found that the problem of nonuniformity in the distribution of a gas phase/liquid phase mixture over the cross section of an apparatus can be solved in a simple fashion by the above-defined distributor devices, as a result of which nonuniformities over the cross section of the apparatus both in respect of the gas phase and in respect of the composition of the phases are avoided.

The invention is illustrated below with the aid of the drawing.

Figure 1:
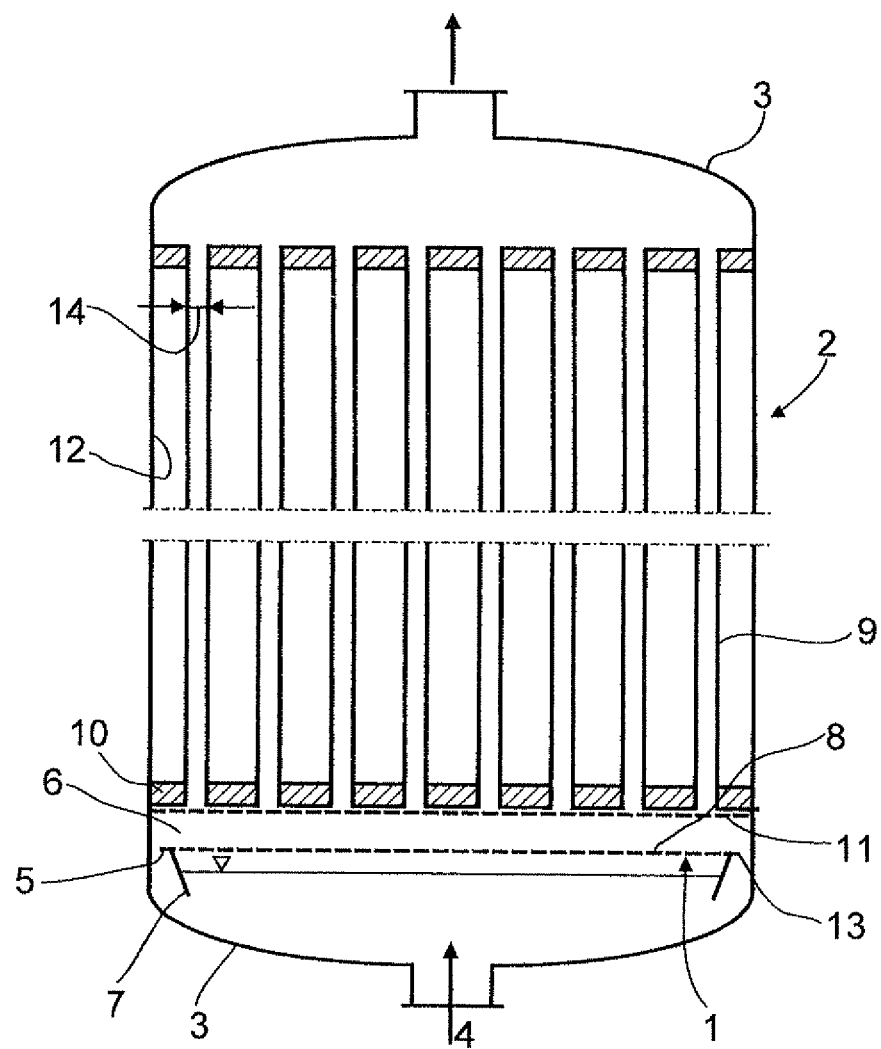
FIG. 1 shows a longitudinal section through an apparatus configured as a shell-and-tube reactor with one embodiment of a distributor device in the lower end cap.

The longitudinal section in FIG. 1 shows an apparatus 2 having a central cylindrical part which is closed off at both ends by a hemispherical end cap 3. A gas phase/liquid phase mixture is introduced into the lower end cap 3 of the apparatus 2 via an inlet opening 4 which, in the embodiment shown in FIG. 1, is, for example, located centrally in the lower end cap 3 and is uniformly distributed by means of a distributor device 1. The distributor device 1 comprises a distributor plate 5 having an active area 6 and a margin 7 which extends in the direction of the feed opening 4. The active area 6, which is located above the feed opening 4, has a circular or polygonal cross section and is provided with through-openings 8 through which the backed-up gas phase disperses.

The margin 7 extending downward in the direction of the feed opening 4 can be inclined at an angle to the flat active area 6, so that the margin 7 takes on the shape of the outer surface of a truncated cone. As a result, the margin 7 fits the contour of the end cap 3, so that the height of the end cap 3 is reduced.

In FIG. 1, the apparatus 2 is configured as a shell-and-tube reactor having a central cylindrical part in which the contact tubes 9 are arranged in tube plates 10. Below the lower tube plate 10 there is, for example, a support grating 11. The distributor device 1 is arranged in the apparatus 2 so that there is a spacing between the distributor plate 5 and the lower tube plate 10, so that the liquid phase flows transversely to the active area 6 at a low velocity. The gas bubbles dispersed by the through-openings 8 of the active area 6 of the distributor device 1 are not deflected by this transverse flow and rise upward in a direction largely perpendicular to the active area 6.

Figure 2:
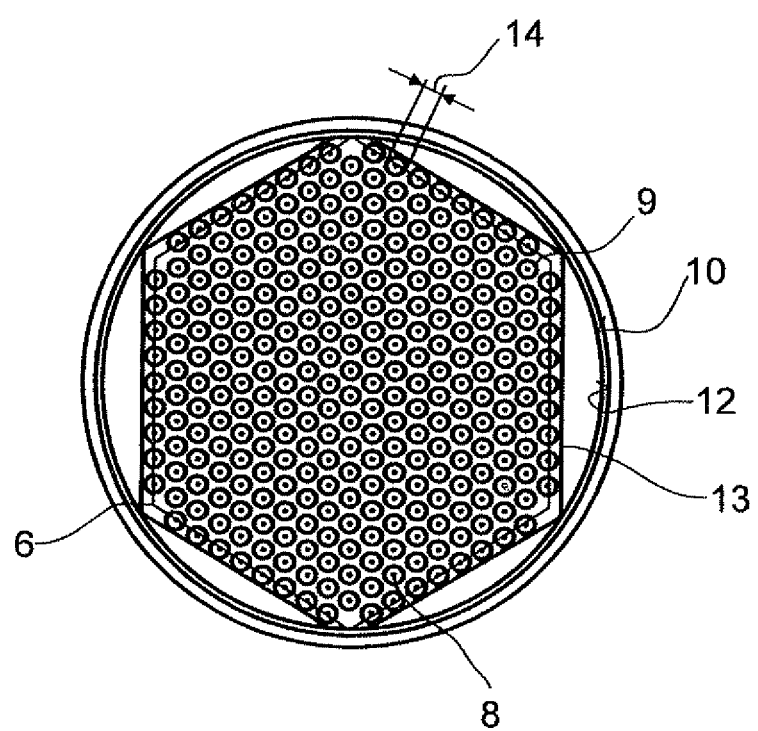
FIG. 2 shows a cross section through an apparatus configured as a shell-and-tube reactor with a distributor device located underneath.

FIG. 2 shows a cross section through an apparatus 2 configured as a shell-and-tube reactor with a distributor device 1 located in the lower region of the apparatus. The active area 6 of the distributor plate 5 has a polygonal cross section, as a result of which the liquid phase has a large flow cross section available to it in the peripheral region between the interior wall of the apparatus 12 and the margin of the distributor plate 13.

In FIG. 2, the plane of the contact tubes 9 of a shell-and-tube reactor is depicted clearly. The contact tubes 9 are uniformly distributed over the cross section of the apparatus 2 and have an internal diameter 14 which is preferably in the range from 30 to 100 mm. A through-opening 8 of the distributor plate 5 is located centrally below each contact tube 9 and has an opening ratio to the contact tube in the range from 0.5 to 20%.

Figure 3:
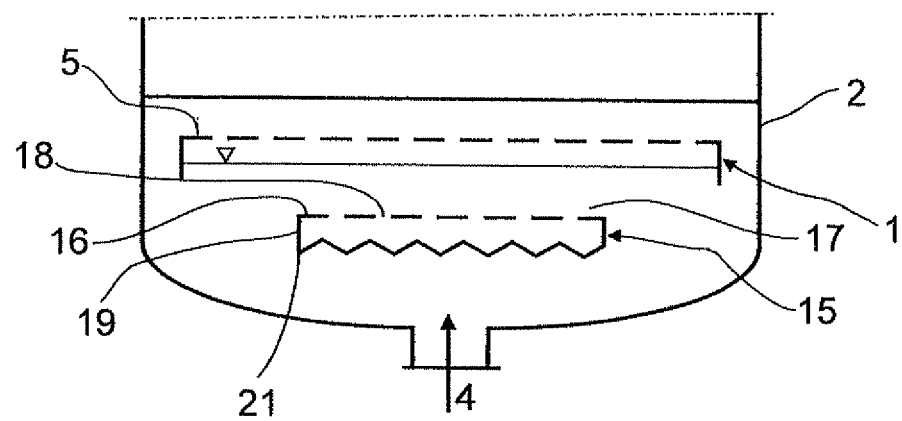
FIG. 3 shows a longitudinal section through an apparatus comprising a preferred embodiment of a distributor device according to the invention with a predistributor.

FIG. 3 shows a distributor device 1 with a predistributor 15 which is arranged below a first distributor plate 5 in the direction of the feed opening 4. The predistributor 15 comprises a distributor plate 16 which has a diameter smaller than that of the first distributor plate 5 and an active area 17 and through-openings 18. A margin 19 extends downward from the distributor plate 16 in the direction of the feed opening 4. The margin 19 can extend downward perpendicular to the distributor plate 16 or at an angle to this.

The distributor device depicted in FIG. 3 is used, in particular, for systems in which large gas bubbles can be formed at the feed opening 4 and lead to instabilities in the gas cushion below the distributor plate 5.

Figure 4:
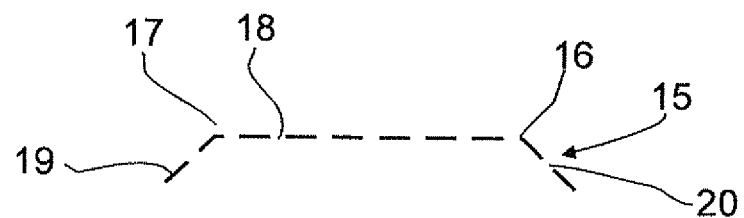
FIG. 4 shows an alternative design of the second distributor plate functioning as predistributor.

In FIG. 4, the margin 19 forms an angle to the distributor plate 16, as a result of which the predistributor 15 has the shape of the surface of a truncated cone. Here, perforations 20 are provided in the inclined margin 19 and the gas phase is dispersed through these in addition to the through-openings 18 of the active area 17.

The margin 19 can have a smooth edge region 21 or have a zig-zag edge at which the gas phase disperses into the liquid phase flowing past.

The invention claimed is:

1. A shell-and-tube reactor comprising:
   a cylindrical housing closed off at lower and upper ends by lower and upper end caps, respectively;
   contact tubes disposed within the housing, the contact tubes being secured to tube plates, wherein the cylindrical housing and contact tubes are adapted to receive a gas phase matter and a liquid phase matter via at least one feed opening in the lower end cap, the gas and liquid phase matters being discharged via the upper end cap; and
   a distributor device for a gas phase/liquid phase mixture, the distributor device being disposed below the lowermost tube plate and comprising:
      a distributor plate arranged horizontally within the housing, the distributor plate including an active area with through-openings, wherein number and arrangement of the through-openings correspond to a plane of the contact tubes in the tube plate, the diameter of the through-openings being from 0.5 to 20% of an internal diameter of one of the contact tubes, and a downward-extending margin, wherein the distributor plate does not extend over the entire cross section of the housing; and
      a predistributor having a second distributor plate having a smaller diameter than the diameter of the first distributor plate, the second distributor plate being disposed between the feed opening and the first distributor plate, and including a second active area with second through-openings and a second downward-extending margin.

2. The shell-and-tube reactor of claim 1, wherein the distributor plate has a circular or polygonal cross section.

3. The shell-and-tube reactor of claim 1, wherein the second downward-extending margin has a zig-zag edge region disposed below the distributor plate.

4. The shell-and-tube reactor of claim 3, wherein the second downward-extending margin extends at an angle of greater than 90° relative to the second distributor plate.

5. The shell-and-tube reactor of claim 3, wherein the second through-openings are present in the second distributor plate and the second downward-extending margin.

6. The shell-and-tube reactor of claim 1, wherein the second through-openings are in the shape of slits or holes.

7. The shell-and-tube reactor of claim 1, wherein the second distributor plate has a total area of the second through-openings, determined from the number and cross-sectional area of the openings, which is from 1.5 to 3 times the corresponding area of the through-openings of the distributor plate.

8. The shell-and-tube reactor of claim 1, wherein the distributor plate is arranged at a distance of 0.01 to 0.4 m from a support grating for a catalyst fixed bed.

9. A shell-and-tube reactor comprising:
   a cylindrical housing dosed off at lower and upper ends by lower and upper end caps, respectively;
   contact tubes disposed within the housing, the contact tubes being secured to tube plates, wherein the cylindrical housing and contact tubes are adapted to receive a gas phase matter and a liquid phase matter via at least one feed opening in the lower end cap, the gas and liquid phase matters being discharged via the upper end cap; and
   a distributor device configured to separate a gas phase out of a gas phase/liquid phase mixture and then disperse the gas phase into the liquid phase, the distributor device being disposed below the lowermost tube plate and comprising:
      a distributor plate arranged horizontally within the housing, the distributor plate including an active area with through-openings, the diameter of the through-openings being from 0.5 to 20% of an internal diameter of one of the contact tubes, and a downward-extending margin, wherein the distributor plate does not extend over the entire cross section of the housing; and
      a predistributor having a second distributor plate, the second distributor plate being disposed between the feed opening and the first distributor plate, and including a second active area with second through-openings and a second downward-extending margin.

10. The shell-and-tube reactor of claim 1, wherein the contact tubes are filled with catalyst particles.

* * * * *

UNITED STATES PATENT AND TRADEMARK OFFICE
CERTIFICATE OF CORRECTION

PATENT NO.       : 8,597,586 B2                                            Page 1 of 1
APPLICATION NO. : 12/090198
DATED            : December 3, 2013
INVENTOR(S)      : Gerlinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this
Twenty-second Day of September, 2015

Michelle K. Lee
*Director of the United States Patent and Trademark Office*